(12) United States Patent
Hirano et al.

(10) Patent No.: US 6,980,382 B2
(45) Date of Patent: Dec. 27, 2005

(54) MAGNETIC DISK DRIVE SYSTEM

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 10/091,670

(22) Filed: Mar. 5, 2002

(65) Prior Publication Data

US 2003/0090824 A1 May 15, 2003

(30) Foreign Application Priority Data

Nov. 9, 2001 (JP) .......................................... 2001-345088

(51) Int. Cl.[7] .............................................. G11B 27/36

(52) U.S. Cl. ....................................... 360/31; 360/77.08

(58) Field of Search ............................. 360/21, 51, 75, 360/77.08, 78.14; 324/210, 212, 226

(56) References Cited

U.S. PATENT DOCUMENTS

| 6,476,992 | B1 | * | 11/2002 | Shimatani ..................... 360/46 |
| 2001/0000302 | A1 | * | 4/2001 | Sasamoto et al. ............. 360/31 |
| 2003/0026017 | A1 | * | 2/2003 | Chong et al. ................. 360/31 |

FOREIGN PATENT DOCUMENTS

JP          7-326032          12/1995

* cited by examiner

*Primary Examiner*—Alan T. Faber
(74) *Attorney, Agent, or Firm*—Greer, Burns & Crain, Ltd.

(57) ABSTRACT

The magnetic disk drive system has a read head and a write head, writes data on the track of the disk, and reads data on the track of the disk. In the present invention, the distance between the heads in the circumferential direction of the disk is computed. The distance between the heads is computed based on the distance between the position of the write head where said data is written and the position of the read head where said data is read. The timing when data is written by the write head is determined by adding said distance to the position where the data is written. Thus, the efficiency of the format of the disk is improved.

27 Claims, 10 Drawing Sheets

MAGNETIC DISK DRIVE SYSTEM

FIELD OF THE INVENTION

The present invention relates to a magnetic disk drive system connected to a computer and capable of writing and reading data and, particularly, to a magnetic disk drive system which improves the efficiency of the disk format by adjusting the timing of writing data.

BACKGROUND OF THE INVENTION

A magnetic disk drive system is necessary for data processing in a computer, and is used to record, read and regenerate data as a hard disk drive (HDD) in a personal computer. Personal computers are becoming widespread. The application area of magnetic disk drive systems is recently becoming very wide and includes AV equipment, vehicle-mounted equipment, etc. in addition to personal computers. As the information handled by such equipment varies widely and the amount of the information might be enormous, the recording capacity of magnetic disk drive systems is being enlarged.

The conventional magnetic disk drive system used as a HDD roughly consists of two portions, a circuit board assembly portion and a disk enclosure portion, which are usually provided in a housing. The magnetic disk drive system is connected to a host system such as a personal computer.

The disk enclosure portion includes a magnetic disk which is rotated at a high speed in a certain direction, and a head which is movable in the radial direction intersecting the tracks on the disk, and the head is able to scan required tracks on the rotating disk. The recorded data read by the head is amplified and output as a regenerated signal. When a recording signal is supplied, data is sent to the head, the head is moved on the disk, and the data is recorded in a write position of a predetermined track.

In a magnetic disk drive system, data is written and recorded on the tracks, in a concentric circle form, on the disk traced by the head, and the recorded data is read and regenerated by the head tracing the tracks. The data is written by the write head Hw of the head and is read by the read head Hr of the head.

More than one servo data are disposed in a radial signal pattern on the disk, and highly accurate servo control of the disk is performed with these servo data, and high data density is realized. The servo data includes a servo mark, track data and sector data which are servo addresses, burst data, etc. The track data includes a track number, and the sector data includes a sector number showing the number of the sector on the track concerned. Usually, the track number is written with a gray code. The track number and sector number are detected with the head, and it is determined in which sector data is written or data from which sector is read.

The burst data included in the servo data is written following the gray code, and has information about the position of the head relative to the track. In general, the burst data consists of four signal patterns of the burst A to the burst D, and these four signal patterns are written on the four tracks respectively disposed in sequence in the radial direction. The relative position between the center of a track and the head can be calculated with the amplitude of the signal on the track read by the head.

By the way, the servo data is disposed so as to be in a plurality of sectors on the tracks in the radial positions on the disk. Consequently, the servo data is disposed at the head of each sector. Then, user data are distributed and written in the sectors. A predetermined amount of the user data is written in the portion following the position in which the burst D is written.

In case of a HDD used for a personal computer, the user data consists of a preamble, a sync mark, user data, an error-correcting code, and a postamble.

On the other hand, in many cases, a head assembly consisting of two heads, a write head and a read head, is used, and the two heads are disposed at the front end of the arm and at a distance from each other in the circumferential direction. Except for a head assembly having a single head by which data is written and read, there is a small difference between the write timing and the read timing because of the physical distance between the two heads.

Because of this, when the user data is written into a sector, it is required that the writing is started at the position at least at a distance between the write head and the read head or more from the burst D in order to prevent the data of the burst D from being overwritten. However, as the dimension of the distance between the installation positions of the write head and the read head is not strictly controlled, there is a variation of the distance between the head assemblies. Furthermore, the write timing fluctuates because it is designed based on the read time. For this reason, even if the write timing is delayed from the burst D by the distance between the write head and read head, there is a possibility of overwriting the data of the burst D.

In the conventional method of controlling the distance between two heads of a head assembly, the distance is not measured for every head assembly. Consequently, the write timing is so set that the writing of the user data is started at the position at a sufficient distance from the burst D in order to prevent the burst D being overwritten and erased under the influence of the variation of the distance between the write head and read head when the user data is written in a sector. Thus, there is a blank where no data exists between the burst D and the written user data. This is the main factor reducing the efficiency of the format of the disk and affects the efficient use of the disk.

It is therefore an object of the present invention to provide a magnetic disk drive system which improves the efficiency of the format of the disk by measuring the distance between heads for every magnetic disk drive system and adjusting the timing of writing data based on the result of the measurement.

SUMMARY OF THE INVENTION

In order to achieve the above object, the present invention provides a magnetic disk drive system which is able to write data on and read the data from a rotating magnetic disk by a write head and a read head respectively disposed at a distance from each other and which has a head-distance measuring means for measuring said distance between said the heads in the circumferential direction of a track of said disk.

The head-distance measuring means computes said distance based on the position of the read head at the timing when said data is written with the write head and the position of the read head at the time when said data is read with the read head.

The write head writes the data for distance measurement in the position, at a distance from the servo information, in a sector and the head-distance measuring means computes said distance based on the position where the data for distance measurement has been written.

The data for distance measurement is written in all of the sectors of said track at the same write timing or in a plurality of sectors selected of said track at the same write timing, and said distance is measured at said sectors.

In addition, the data for distance measurement is written in the sectors of all of the tracks of said disk at the same write timing, or in the sectors of a plurality of the selected tracks on said disk at the same write timing, and said distance is measured at said sectors.

When said distance increases in the radial direction of said disk, the number of the sectors in which the data for distance measurement is written are increased per track.

The data for distance measurement is written in a position predetermined with reference to said servo information at the write frequency of said servo information, or at the write frequency of the data written in the data area of said disk.

Further, the head-distance measuring means obtains the position of the read head at the time when reading the written data for distance measurement, and computes said distance.

Said position of the read head is detected with reference to said servo information, and is detected by incrementing the read timing of the read head sequentially from the position predetermined with reference to said servo information, or by decrementing the read timing of the read head sequentially from the position predetermined with reference to said servo information.

In addition, said position of the read head is detected by renewing the read timing of the read head while repeating the increment and the decrement of the read timing of the read head alternately centering the position predetermined with reference to said servo information, or is detected by including the end position of the data for distance measurement in the search window opened at the read timing of the read head.

Said position of the read head is determined based on the largest one in a plurality of said read timings corresponding to a plurality of said search windows in which said end position is included.

The read head performs the read operation at the same read timing for the plurality of said sectors in which the data for distance measurement has been written.

Further, a plurality of positions, where said distances are measured in the radial direction of the disk, are selected, and said distances, which are not measured in relation to the other positions, are determined by interpolation based on said distances measured in correspondence with said positions, and a plurality of positions where said distances are measured are selected at regular intervals.

The distance measured by the head-distance measuring means is stored in the internal memory of the system, or in said disk.

The distance is measured and stored when the power of the system is turned on, and is read out when the power of the system is turned on again.

When data is written on said disk, the write timing of the write head is determined by adding said distance to the position where the data is written.

DETAILED DESCRIPTION OF THE INVENTION

In order to make the effect of the present invention clear, a general magnetic disk drive system relating to the present invention will be explained as follows.

Figure 1:
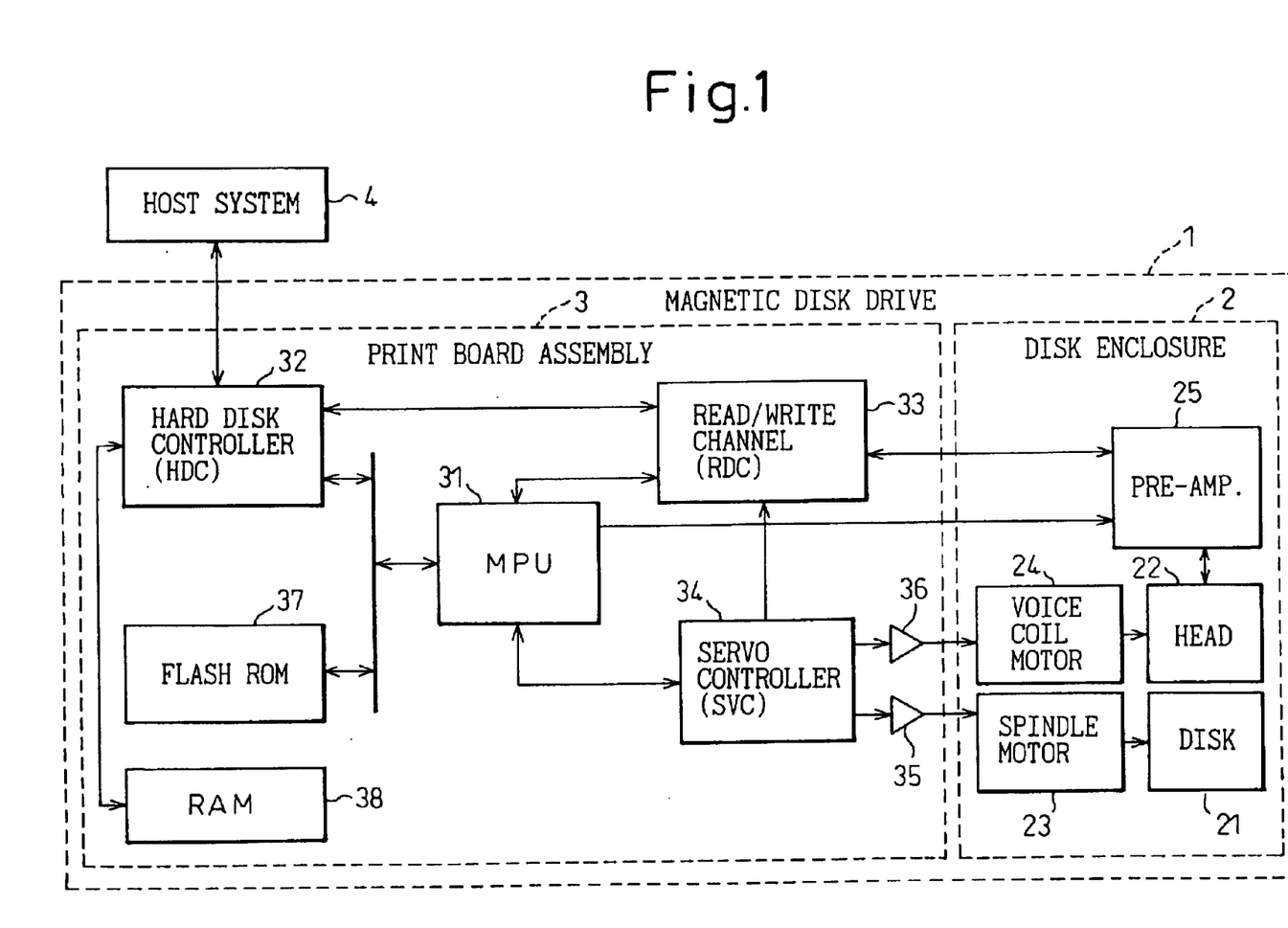
FIG. 1 is a schematic block diagram showing the configuration of a magnetic disk drive system.

The configuration of a conventional magnetic disk drive used as a HDD is outlined in a block diagram in FIG. 1. The magnetic disk drive 1 roughly consists of two portions, a disk enclosure portion 2 and a circuit board assembly portion 3, which are provided in a housing. The magnetic disk drive 1 is connected to a host system 4 such as a personal computer.

The disk enclosure portion 2 includes a magnetic disk 21, a head 22, a spindle motor 23, a voice coil motor 24, and a preamplifier 25, and the disk 21 is rotated at a high speed in a certain direction by the spindle motor 23. The head 22 is fixed to the front end of the arm (not shown) fitted to the voice coil motor 24 and, when the voice coil motor 24 is driven, the head 22 moves in the radial direction of the disk 21 intersecting the tracks (or cylinders), thus scanning the requested tracks (or cylinders).

The head 22 consists of a single head capable of write and read in some cases, but consists of a write head Hw and a read head Hr, in this embodiment, which are fixed to the front end of the arm at a distance from each other in the circumferential direction of the disk so that writing and reading may be performed with the different heads. Furthermore, a ramp mechanism (not shown) for engaging the front end of the arm is usually provided in order to detach the head 22 from the disk 21 and hold the head 22 when the scanning by the head 22 is not performed.

The recorded data read by the head 22 is sent to the preamplifier 25, which amplifies and outputs this recorded data as a regenerated signal. When the recording signal for the head 22 is supplied to the preamplifier 25, the preamplifier 25 sends the data to be recorded to the head 22 to record the data in the write position on a predetermined track on the disk 21.

On the other hand, the circuit board assembly unit 3 includes a MPU 31, a hard disk controller 32, a read/write channel 33, a servo controller 34, drivers 35 and 36, a flash ROM 37, and a RAM 38, which are mounted on a board.

The MPU 31 operates in accordance with the program stored in the ROM 37, and controls the whole of the magnetic disk drive system 1, and performs principally the positioning control of the head 22, the interface control, the initialization and setting of the peripheral LSIs, defect management, etc.

The hard disk controller contains the RAM 38, performs error corrections, PLL clock generation, etc., and is an interface for controlling the input to and the output from the system 4. The servo controller 34 drives the spindle motor 23 and the voice coil motor 24, and control the driver 35 for the spindle motor 23 and the driver 36 for the voice coil motor 24 according to the commands from the MPU 31.

The read/write channel 33 modifies the data to be written into the disk 21 supplied from the hard disk controller 32 and outputs it to the preamplifier 25, and detects the data in the signal read out from the disk 21 by the head 22 and output from the head IC, code-modulates the data, and outputs the data to the hard disk controller 32.

The magnetic disk drive system 1 is configured as described above, and data is written and recorded on the tracks in a concentric circle form on the disk 22 traced by the head 22, and the recorded data is read and regenerated by the head 22 tracing the tracks. The data is written by a write head Hw of the head 22, and is read by a read head Hr of the head 22.

More than one servo data are disposed in a radial signal pattern on the disk 21, and highly accurate servo control for the disk 21 is performed with the servo data, and a high data density is realized. The role of the servo data is as described above.

Figure 2:
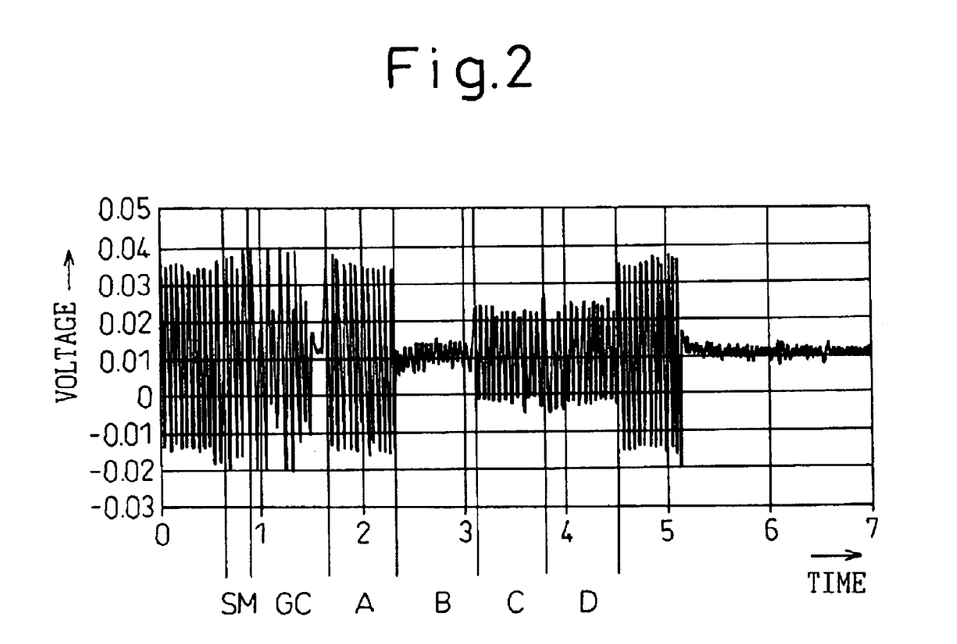
FIG. 2 shows the waveform of the regenerated signal of the servo information written in a magnetic disk.

A specific example of the waveform of the regenerated signal of the servo data written in the track on the disk by the head 22 is shown in FIG. 2. In the figure, the horizontal axis indicates the time, and the vertical axis indicates the amplitude of the signal.

In FIG. 2, SM indicates the data portion of the servo mark, GC indicates the gray code data, and A, B, C, and D indicate the burst A, burst B, burst C and burst D respectively. The burst following the burst D is a dummy burst. The regenerated signal shown in FIG. 2 has no data following the dummy burst.

Next, an embodiment of a magnetic disk drive system according to the present invention will be described with reference to FIG. 3 to FIG. 9.

As described above, in the conventional magnetic disk drive, as the distance between the two heads, a write head and a read head, of a head assembly mounted in the magnetic disk drive is not known accurately, the variation in the distance between head assemblies affects the user data written in the sector. Thus, it is required that the writing timing is set so that the write of the user data is started at the position at a sufficient distance from the burst D in order to prevent the burst D being overwritten and erased when the user data is written.

For this reason, in the magnetic disk drive system of this embodiment, the timing when the user data is written on the disk is set after the distance between the read head and the write head in the circumferential direction of the disk has been determined by writing the data for measurement of said distance on the disk followed by reading the said data. The write timing is decided based on the distance between the read head and the write head in the circumferential direction provided by the above measurement, and then the user data is written on the disk.

In the magnetic disk drive system of this embodiment, a magnetic disk drive having the same system configuration as the magnetic disk drive shown in FIG. 1 is used. The internal disk of the magnetic disk drive system 1 has been formatted like the disk in the conventional magnetic disk drive system, and the head 22 has a write head Hw and a read head Hr mounted on the front end of the arm driven by the voice coil motor 24, which are used exclusively for writing and reading respectively. The method of measuring the distance between the write head Hw and the read head Hr does not depend on one of the heads being disposed at the front or back of the other one in the rotational direction of the disk, but is described below under condition that the read head Hr is disposed before the write head.

Figure 3:
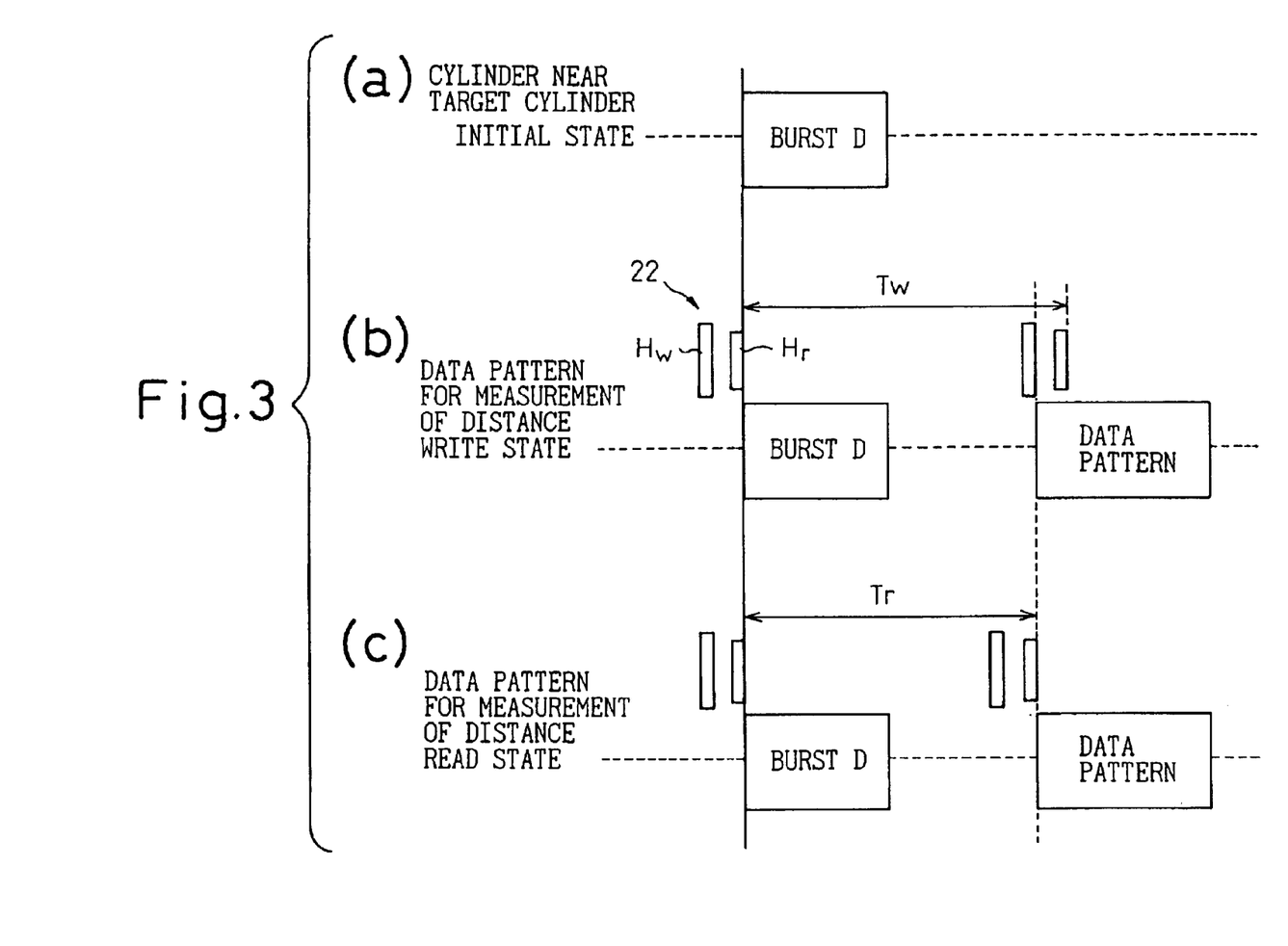
FIG. 3 depicts a write state and a read state of the data for measurement of the distance between the read head and the write head in the circumferential direction of the disk.

Here, the method of measuring the distance L between the write head Hw and the read head Hr in the circumferential direction is described with reference to FIG. 3 to FIG. 5. These drawings show the data written in the cylinder on the disk 21 schematically and the horizontal axis indicates the time. The write head Hw and read head Hr are shown as small boxes, the vertical length of the box showing the write head Hw is larger than the vertical length of the box showing the read head Hr. The write timing and read timing of the head 22 are decided with reference to the operation timing of the read head Hr.

At first, before the user data is written on the disk, the data for measurement of the distance between the read head Hr and the write head Hw is written in the circumferential direction of the disk. At the front end of the data pattern for measurement of the distance, a sync mark SM indicating the start of the data for measurement of the distance is added. As the data for measurement of the distance between the read head Hr and the write head Hw in the circumferential direction of the disk, the data pattern for correcting the servo-post-data may also be used.

At first, targeting the cylinder in which data is going to be written, a cylinder near the target cylinder is selected, and then the head 22 is kept above the selected cylinder. FIG. 3(a) shows the initial state, followed by writing user data, of a sector of the track above which the head 22 is kept, and shows the burst D disposed at the rear end of the servo data written in the front end of the sector. Following the burst D, data is written.

After the initial state, the data pattern for measurement is written in the sector above which the head is kept. The write state is shown in FIG. 3(b). The write reference value Tw of the head Hw in this state is set to a large value enough to prevent the data of the burst D being overwritten by the data pattern for measurement and being erased. The write reference value Tw is set with reference to the position of the front end of the burst D.

As there is a distance L between the write head Hw and the read head Hr, the write timing at which the data pattern for measurement is written in the sector is delayed after the write reference Tw by the time needed due to the distance L, and in this state the position to start writing the data pattern for measurement may not be decided accurately.

After the data pattern for measurement is written in the this sector, the operation mode is changed from the write mode to the read mode, and then the data for measurement written in this sector is read to obtain a read reference value Tr. The read reference value Tr corresponds to the position where the data pattern for measurement starts to be written, and the position of the front end of the data pattern for measurement is thus detected. The read state of the data pattern for measurement is shown in FIG. 3(c).

Since the read reference value Tr corresponds to the position where the data pattern for measurement starts to be written, and the write reference value Tw is known, when the read reference value Tr is obtained, the distance L between the read head Hr and the write head Hw in circumferential direction can be given by the following equation.

$$L=Tw-Tr,$$

In case that the write head Hw is disposed in front of the read head Hr, Tw and Tr are exchanged with each other in the above equation.

Obtaining the read reference value Tr is described below with reference to FIG. 4. FIG. 4(a) shows the read state as in FIG. 3(c), and that the read reference value Tr corresponds to the position of the front end of the data pattern for measurement. In order to obtain the read reference value Tr, the sync mark added at the front end of the data pattern for measurement is detected.

The operation to detect the sync mark is started at the rear end of the data pattern of the burst D, and a search window Ws having a window width w following the read head Hr is opened while being increased every read timing t. The searching range of the search window Ws is W following the front end of the read head Hr at a read timing t. The reasons why the operation of detecting the sync mark is started at the rear end of the data pattern of the burst D is that it is clear that the data pattern for measurement does not exist in the area in which the burst D is written and that the sync mark of the data pattern for measurement is detected efficiently.

Figure 4:
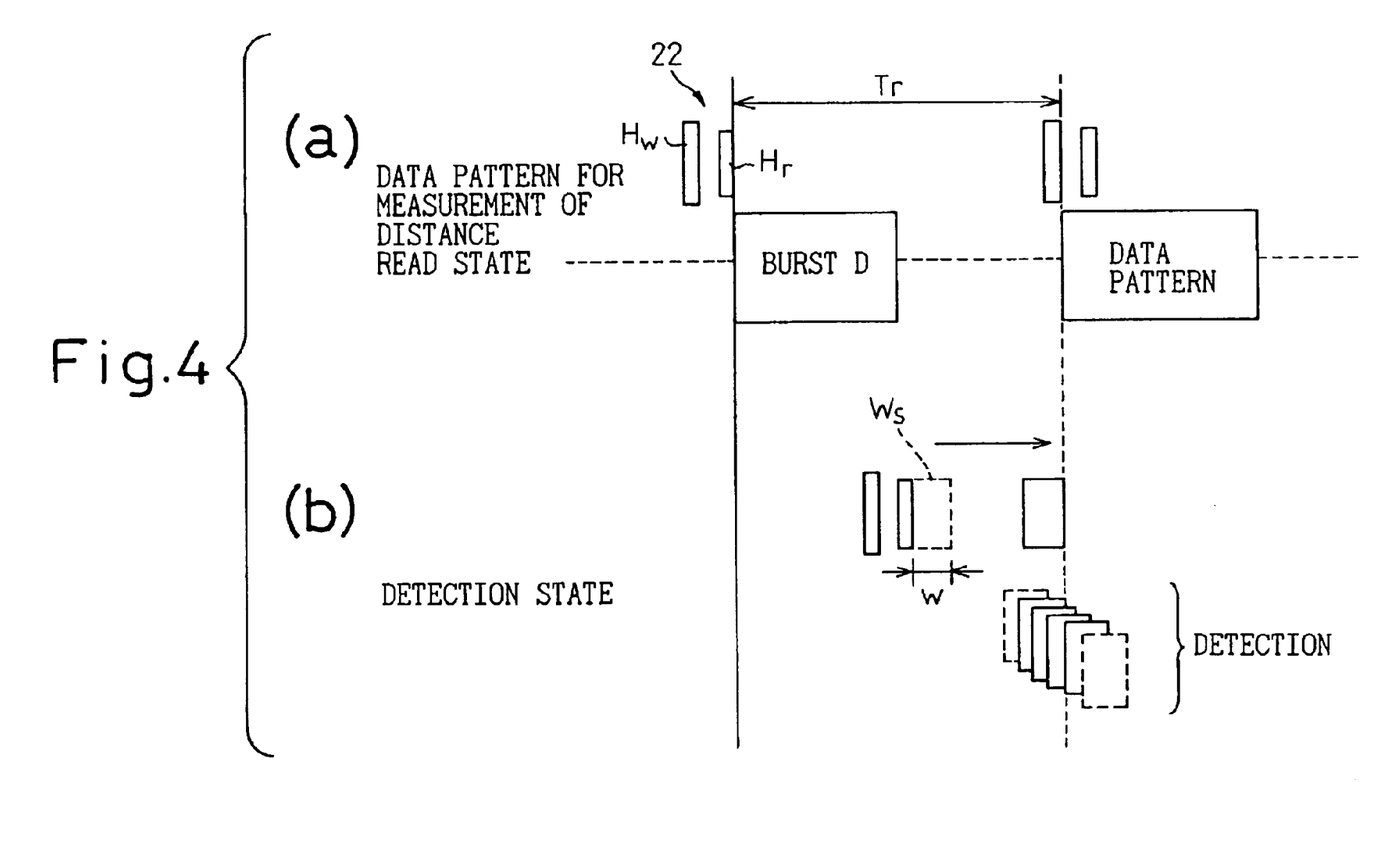
FIG. 4 depicts the operation to detect the read reference value of the data for measurement of the distance between the read head and the write head in the circumferential direction of the disk.

The state of detecting the sync mark by this search window Ws is shown in FIG. 4(b). Since a search window is opened every read timing t, a plurality of search windows Ws appear one by one on the time axis. In the figure, the search window which does not include the sync mark in the width W is shown by dashed lines, while the search window which includes the sync mark is shown by solid lines. The number of the search windows Ws including the sync mark varies according to the time interval between read timings t and the width w of the search window Ws.

The read reference value Tr is determined by using these search windows Ws including the sync mark. That is, it is determined that the rear end of the search window Ws, the read timing t of which is largest in the read times of a plurality of the windows including the sync mark, matches the read reference value Tr. The read timing t of this search window is taken as the read reference value Tr. As described above, the read reference value Tr can be obtained by using the search windows Ws.

When the read reference value Tr is obtained, the distance L between the read head Hr and the write head Hw in the circumferential direction of the disk is calculated with the above equation. Next, obtaining, by using this distance L, the timing when data is written in the sector will be described with reference to FIG. 5. FIG. 5(a) shows the state, as in the initial state shown in FIG. 3(a), where a track on which data is going to be written has been selected and the head 22 is kept above the track.

When a predetermined data pattern is written following the burst D, in the conventional magnetic disk drive system, sufficient margin is provided for the read timing in order to prevent the data of the burst D being erased by writing the predetermined data pattern, but, in the magnetic disk drive system of this embodiment, as the distance L between the read head Hr and the write head Hw of the head 22 in the circumferential direction of the disk is measured and determined accurately, the write starting position, for example, in case that the data pattern is written following the burst D, may be set in consideration of the distance L between the read head Hr and the write head Hw. In consideration of this distance L, the write timing of the write head Hw may be matched with the target position where the data writing is started.

Figure 5:
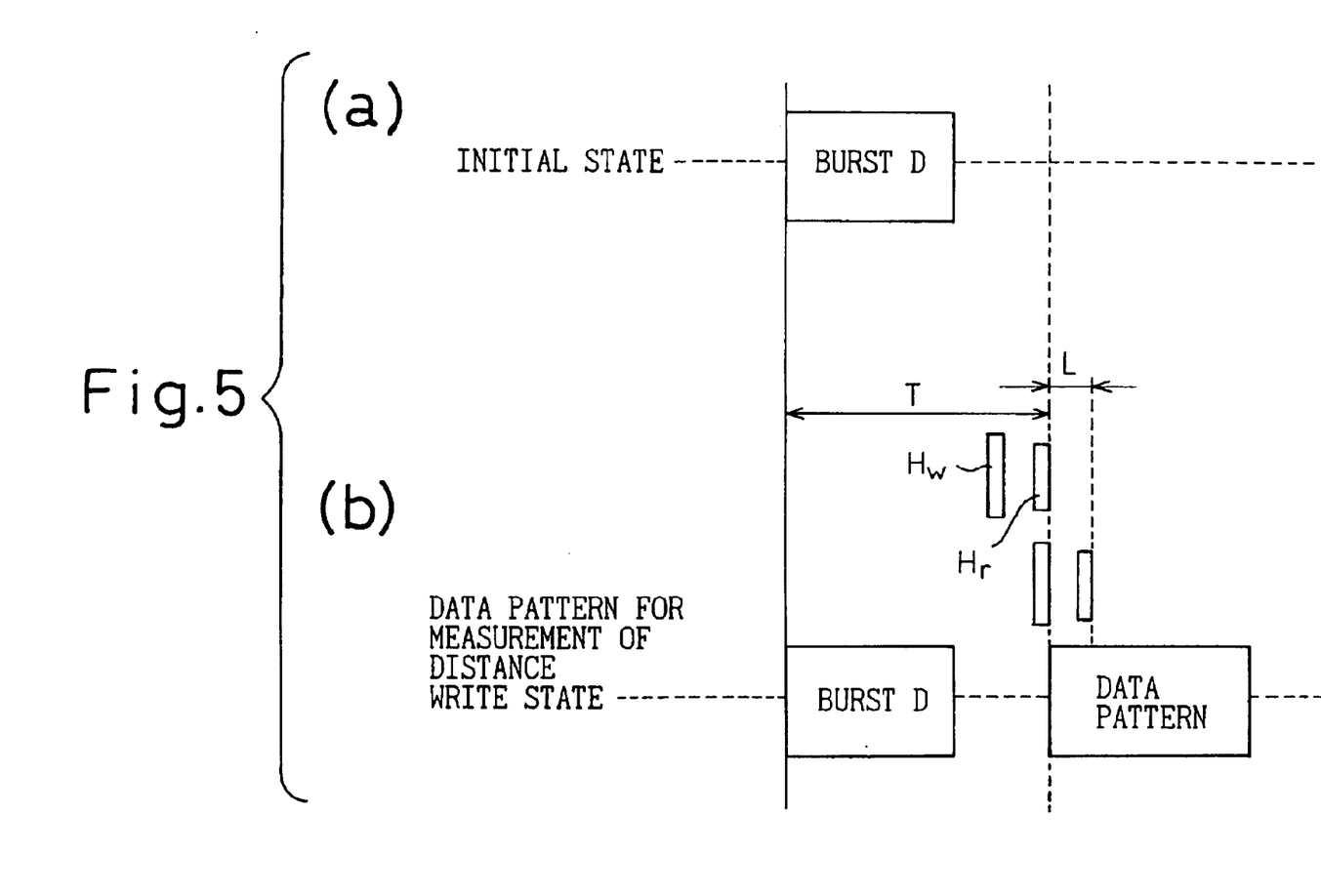
FIG. 5 depicts the state that the data for measurement of the distance between the read head and the write head in the circumferential direction of the disk is written at the write timing at which the distance between the read head and the write head obtained from the read reference value is considered.

FIG. 5(b) shows the state that the predetermined data pattern is written. Here, how to determine the write timing of the data pattern is described. The distance L is obtained as the difference between the write reference value Tw and the read reference value Tr by the above equation. When the target position T where the write of the data pattern is started has been decided, the write start position Tws of the write head is given by the following equation.

$$Tws=T+L$$

FIG. 5(b) shows the case that the predetermined data pattern is written just after the burst D. Although it is possible to set the target position T to the data length of the burst D, the target position T, in this case, is set to the length having the data length of the burst D and a margin.

As described above, by writing the data pattern for measurement of the distance between the read head Hr and the write head Hw before writing the predetermined data pattern, and by detecting the read timing for the start-up of the front end of the data pattern for measurement of the distance, the distance L, in the circumferential direction of the disk, between the read head Hr and the write head Hw incorporated in the magnetic disk drive, may be determined accurately. Even if the distance L between the write head Hw and the read head Hr is not checked when the heads are mounted, the relationship between the write timing of the write head Hw and the read timing of the read head Hr may be determined based on the computed distance L. Consequently, the write timing with reference to the read head Hr may be decided, and thereby a predetermined data pattern may be written in the area where a data pattern should be written.

For the operation described above, the function of the read/write channel 33 of the magnetic disk drive shown in FIG. 1 is used, which realizes the operation of writing and reading the data for measurement of the distance in the circumferential direction of the disk and the measurement of the distance between the read head Hr and the write head Hw of the head 22 in the circumferential direction of the disk.

Figure 6:
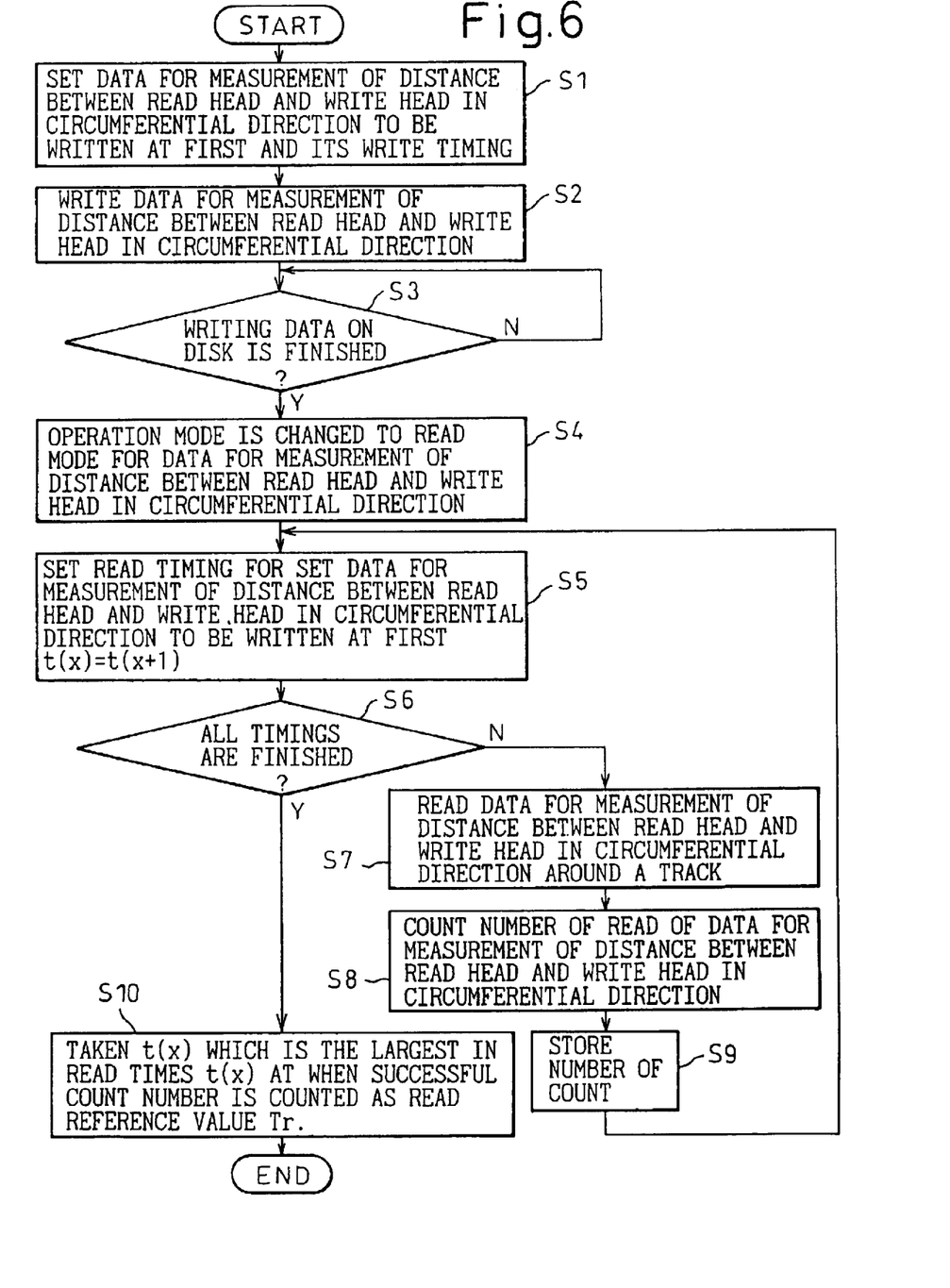
FIG. 6 is a flow chart depicting an operation to measure the distance between the read head and the write head.
Figure 8:
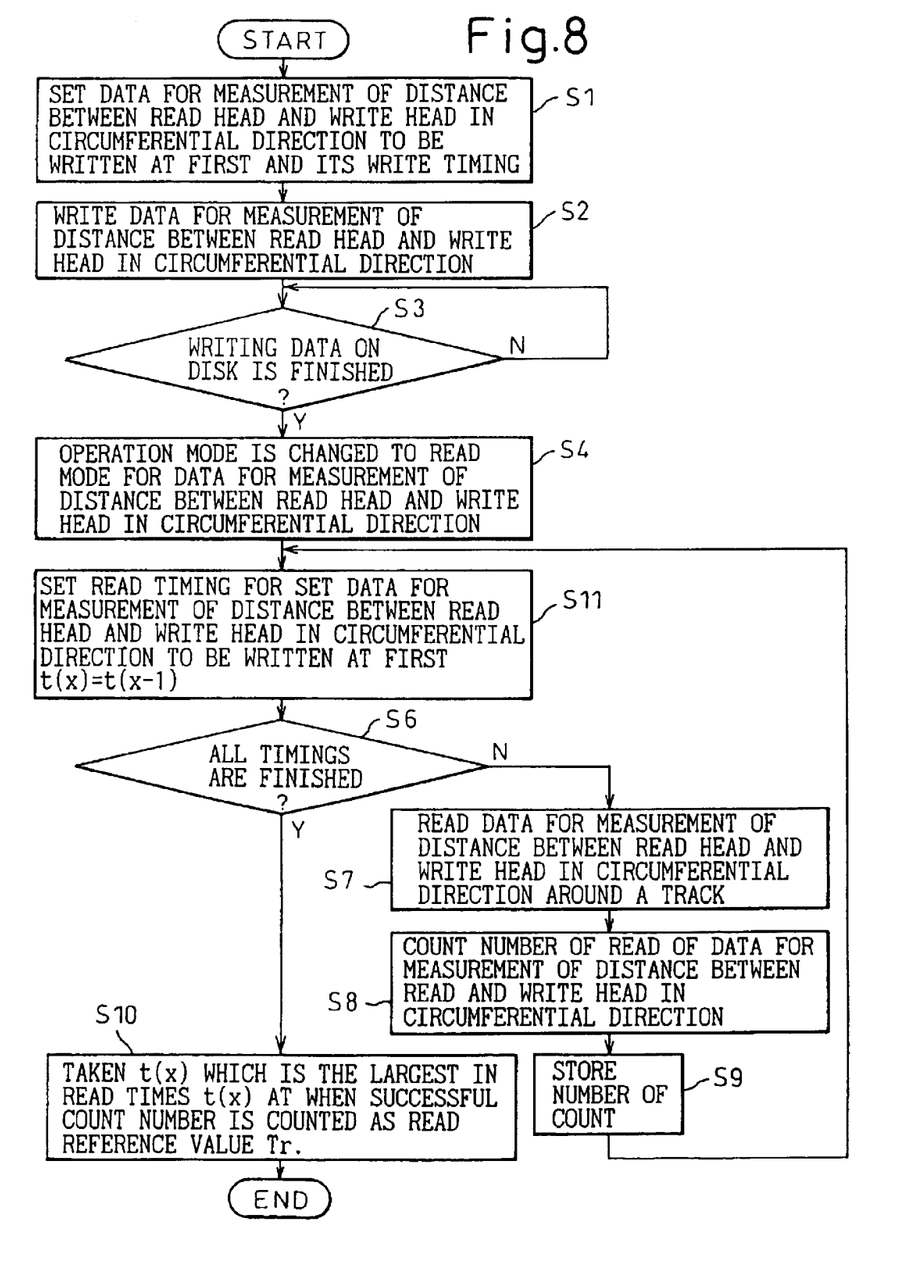
FIG. 8 is a flow chart depicting another operation to measure the distance between the read head and the write head.
Figure 9:
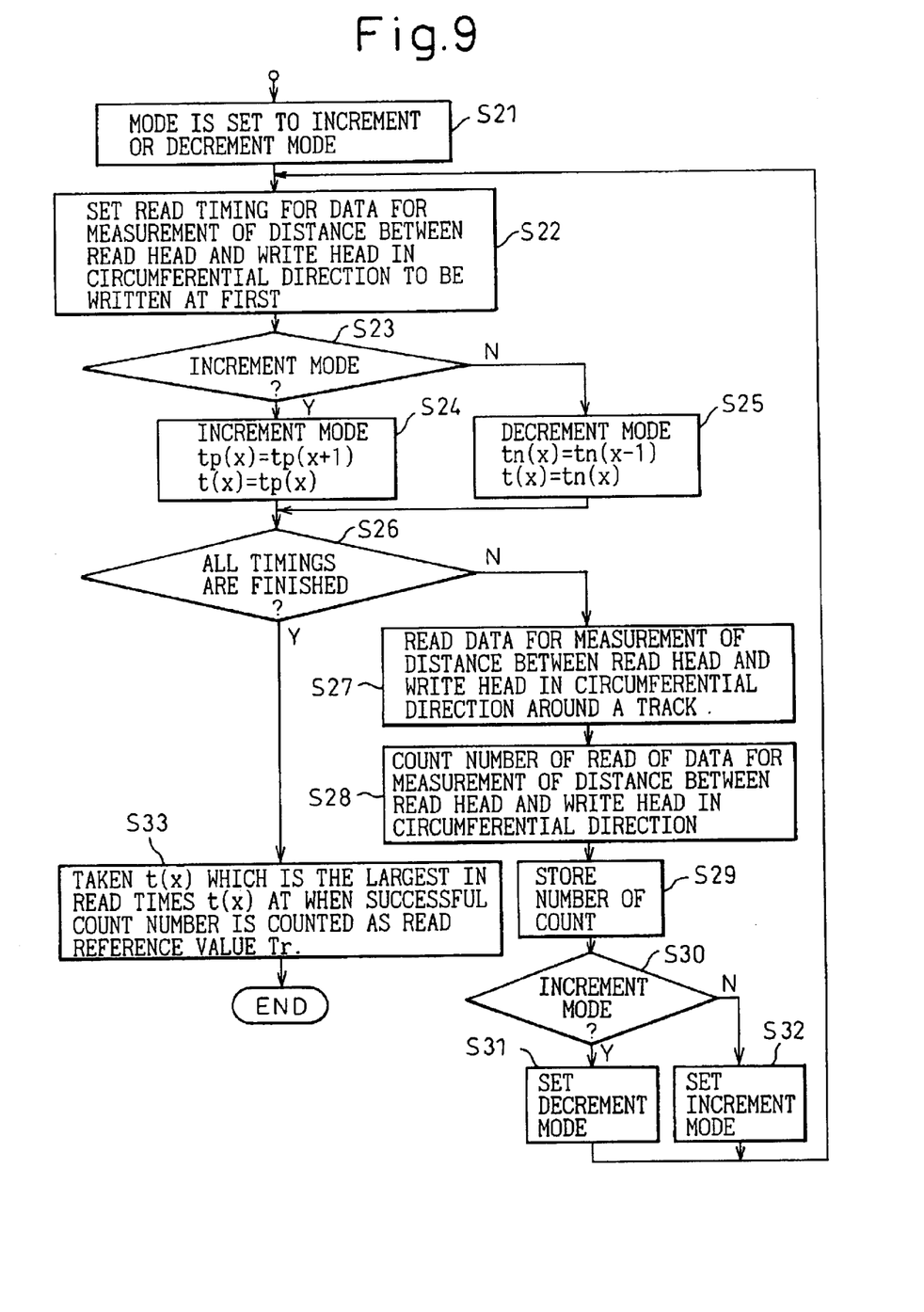
FIG. 9 is a flow chart depicting another operation to measure the distance between the read head and the write head.

Next, an specific example of the measurement of the distance of between the read head Hr and the write head Hw of the head 22 in the circumferential direction of the disk will be describe with reference to the flow charts shown in FIG. 6, FIG. 8, and FIG. 9. FIG. 6 shows a flowchart of an operation to detect the data pattern for measurement while incrementing the read timing from the position of the read end of the burst D. FIG. 8 shows a flow chart of an operation to detect the data pattern for measurement while decrementing the read timing from a position at the back of the position of the front end of the data pattern for measurement. FIG. 9 shows a flow chart of an operation to detect the data pattern for measurement while alternately incrementing and decrementing the read time from an intermediate value which is set appropriately.

In the flow chart in FIG. 6, at first, the operation mode is set to the write mode for writing the data for measurement of the distance between the read head and write head in the circumferential direction of the disk. Before a predetermined data pattern is written, the data for measurement of the distance between the read head and write head in the circumferential direction of the disk, which will be written at first, for example a data pattern for correcting servo-post-data, is set, and the write timing at when writing the data for measurement is set (step S1). The write timing is decided with reference to the operation timing of the read head Hr, and with sufficient margin from the rear end of the burst D in order to prevent the data of the burst D being overwritten with the data for measurement.

Figure 7A:
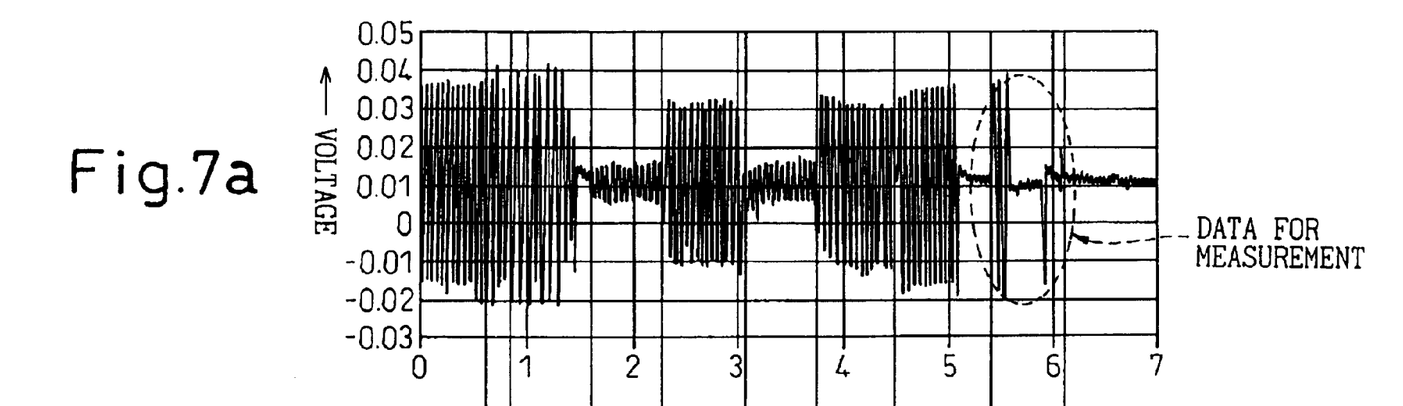
FIGS. 7a and 7b show the waveforms in case that the data for measurement of the distance between the read head and the write head in the circumferential direction of the disk is written at the write timing to which the distance between the read head and the write head is considered

After that, the disk 21 is driven at a predetermined number of rotations, and the head 22 is kept over the track where the data for measurement is going to be written. At this position, the data pattern for measurement started to be written in a predetermined sector or in all sectors of this track at the write timing which has been set (step S2). FIG. 7a shows the waveform of the regenerated signal of the data for measurement written in the sector.

When the data for measurement on the disk 21 (step S3) has been written, the operation mode is changed to the read mode for reading the data for measurement of the distance between the read head and the write head in the circumferential direction of the disk (step S4).

Then the read timing t(x) of the read head Hr is set to detect the front end of the data pattern for measurement of the distance between the read head and the write head in the circumferential direction of the disk (step S5). The read timing t(x) is renewed while being incremented sequentially at a predetermined interval from the read timing when the rear end of the data pattern of the burst D is read.

Since the position of the read head Hr at the time when the data pattern for measurement is written is the write reference value Tw, the read timing is incremented sequentially until the position of the read head Hr becomes this write reference value Tw. In case that the read head Hr is in front of the write head Hw, the position where the write of the data pattern for measurement is started always follows the position of the read head Hr, thus being detected by incrementing the read timing sequentially.

Every sector, in which the data pattern for measurement has been written, around the track, a search window Ws is opened as shown in FIG. 4(b) at the read timing t(x) set at the step S5 (N at the step S6). It is determined whether there is the sync mark, which exists at the front end of the data for measurement, within the bound of the search window Ws, for the sectors around the track (step S7).

When the sync mark is not detected in any one of the sectors by the search window, the number of detection/reads of the sync mark for the sectors of a round of the track is 0. When the sync mark is detected, 1 is added to the number of detection/reads of the sync mark every the sector to obtain the total number of detection/reads of the sync mark around the track (step S8).

In this case, if the number of sectors in which the data pattern for measurement has been written is 100, the total number of detection/reads of the sync mark is 100. When the total number 100 is counted, this number is stored as a successful count number. The read timing t(x) at which the successful count number is counted is stored (step S9). At that time, the detection/read of the sync mark at the read timing t(x) set at the step S5 has been finished for all of the sectors around the track. Then the process returns to the step S5, where the read timing t(x) is incremented to the read timing t(x+1), and the read timing t(x) is replaced with the read timing t(x+1). After that the detection/read of the sync mark in the data for measurement is performed at the renewed read timing t(x).

When the detection/reads of the sync mark in the data pattern is finished for all of the read timings t(x) up to the write reference value Tw (in case of Y at the step S6), the read timing t(x) which is the largest in the read timings t(x) at when the successful count number is counted at the step S7 is taken as the read reference value Tr based on the principle shown in FIG. 4(b) (step S10).

When the read reference value Tr is obtained, the distance L between the read head and the write head in the circumferential direction of the disk may be given by the equation L=Tw−Tr by using the write reference value Tw which is already known, and thereby the distance between the read head Hr and the write head Hw may be obtained for every magnetic disk drive.

Based on the distance L, the write start position Tws of the predetermined data pattern for the write target position T may be decided according to the above equation, Tws=T+L. A specific example of that is shown with a regenerated signal waveform in FIG. 7b. This figure shows the state that a predetermined data pattern has been written after the burst D data pattern.

Figure 7B:
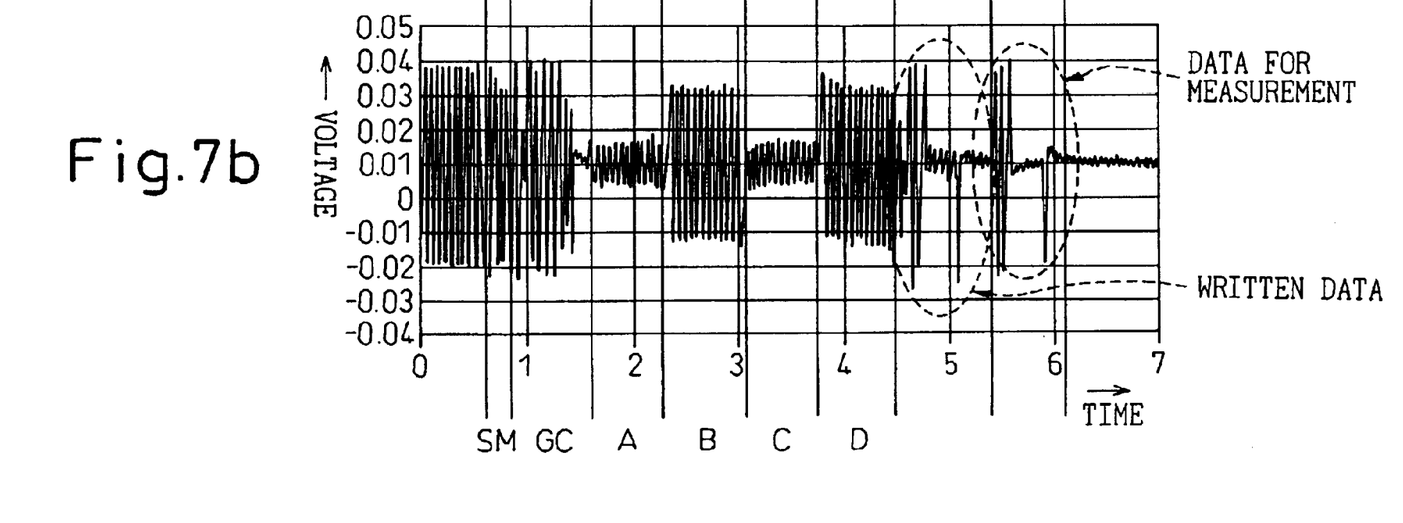

In this state, a data pattern for measurement has been written as the predetermined data pattern, and the data pattern for measurement which was written at first is kept as it is for comparison. As can be understood from this figure, a predetermined data pattern may be written in the close vicinity of the burst D data pattern without wasting space.

Next, with reference to the flow chart shown in FIG. 8, the operation to detect the data pattern for measurement while decrementing the read timing from a predetermined position at the back of the front end of the data pattern for measurement will be described. This flow is the same as the flow, shown in FIG. 6, of the operation for the measurement of the distance between the read head and the write head in the circumferential direction of the disk, except for the setting of the read timing t(x), that is, the step S5 in FIG. 6 is replaced with the step S11 in FIG. 8. Thus, only the operation of the step S11 will be explained. Operations of other steps are the same as ones of the corresponding steps in FIG. 6.

In the operation flow in FIG. 6, the data pattern for the measurement of the distance between the read head and the write head in the circumferential direction of the disk is detected while incrementing the read timing from the rear end of the burst D. However, in the operation flow in FIG. 8, the data pattern is detected while decrementing the read timing from the predetermined position at the back of the front end of the data pattern.

In case that the read timing t(x) is set while incrementing it from the rear end of the burst D, if the distance between the position where the data pattern for measurement is written at first and the rear end of the burst D is large compared with the distance between the read head and the write head, it is a long time from the rear end of the burst D to the write position. For this reason, the read timing t(x) is not incremented from the rear end of the burst D but is decremented at a predetermined interval from the read reference value Tw. The processes after the step S11 are the same as ones in FIG. 6.

Next, with reference to FIG. 9 and FIG. 10, the operation to detect the data pattern while alternately incrementing and decrementing the read timing from a intermediate value which is set appropriately will be described. In this operation, the flow from the step of setting the operation mode to the write mode for writing the data for measurement at first to the step of changing the operation mode to the read mode for reading the written data pattern for measurement is the same as the flow from the step S1 to the step S4 in the flow chart shown in FIG. 6, and is not shown in the flow chart shown in FIG. 9 to simplify the explanation of the operation.

Figure 10:
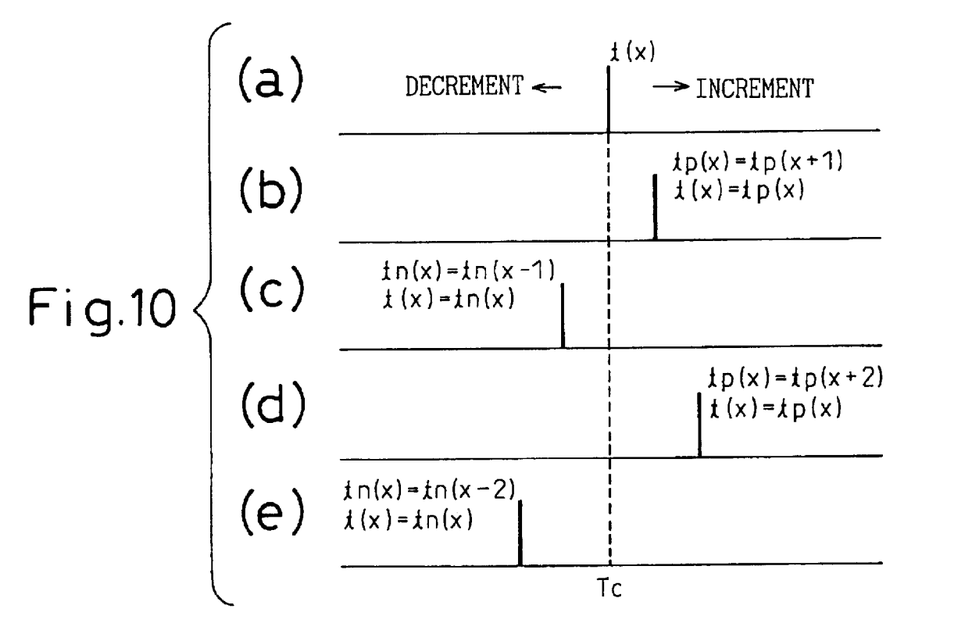
FIG. 10 depicts how to set timings in the measuring operation shown in FIG. 9.

In FIG. 10, the outline of the procedure of alternately incrementing and decrementing the read timing from a intermediate value which is set appropriately is described. The intermediate value Tc is set to an appropriate position between the rear end of the burst D and the write reference value Tw (FIG. 10(a)). With reference to the intermediate value Tc, the read timing t(x) is alternately incremented and decremented at a predetermined interval to generate all the read timings t(x) ((b) to (e)), when a predetermined read area is searched.

In the process flow shown in FIG. 9, after the operation mode has been changed to the read mode for reading the data for the measurement of the distance between the read head and the write head in the circumferential direction of the disk, the read timing setting mode is set to the increment mode in which the read timing is incremented, or the decrement mode in which the read timing is decremented (step S21). At first, the read timing setting mode is set to the increment mode as shown in FIG. 10.

Next, an intermediate value Tc necessary for setting the read time is selected. For example, the center position between the rear end of the burst D data pattern and the read reference value Tw may be selected. The read timing t(x) is set with reference to this intermediate value Tc (step S22).

Since the read timing setting mode is set to the increment mode at the initial state (Y at the step S23), the read timing t(x) which has been set is incremented by 1 to generate the increment side read timing tp(x+1), which is taken as the read timing t(x) (step S24).

The detection/read process for the front end of the data pattern for measurement, after the read timing t(x) has been set, is the same as the process from the step S7 to the step S9 in FIG. 6. That is, for every sector, in which the data pattern for measurement has been written around the track, a search window Ws is opened at the read timing t(x) set at the step S24 (N at the step S26), and it is determined whether there is the sync mark of the data pattern for measurement within the bound of the search window Ws, for the sectors of a round of the track (step S27).

When the sync mark is detected for the sector in which the data pattern for measurement has been written, 1 is added to the number of detection/reads every sector to obtain the total number of detection/reads around the track (step S28).

The number of detection/reads for the sectors, in which the data pattern for measurement has been written, around the track is stored as a successful count number. The read timing t(x) at which the successful count number is counted is stored (step S29). At that time, the detection/reading of the sync mark at the read timing t(x) set at the step S5 has been finished for all of the sectors of a round of the track.

Since the read time t(x) is the increment side read timing tp(x) until this step (Y at step S30), the read timing setting mode is changed to the decrement mode so that the decrement side read timing tn(x) is taken as the read timing t(x) (step S31).

After that, the process returns to the step S22, and the read timing t(x) which has been obtained is decremented by 1 according to the operation for the decrement mode (N at the step S23) to generate the decrement side read time tn(x−1), which is taken as the read timing t(x) (step S25). The process of counting the number of detection/read for the sectors of a round of the track from the step S26 to the step S29 is the same as the process in case of the increment side read timings.

As described above, by switching alternately between the decrement mode being set at the step S31 and the increment mode being set at the step S31, the read time t(x) to which the predetermined interval is incremented by 1 is set for each of the increment side and the decrement side while repeating alternately the increment side read time tp(x) and the decrement side read timing tn(x) as shown in FIG. 10.

When the detection/read of the sync mark is finished at all of the read timings corresponding to the positions from the rear end of the burst D data pattern to the write reference value Tw (Y at the step S26), the read timing t(x) which is the largest in the read timings t(x) at when the successful count number is counted at the step S29 is taken as the read reference value Tr (step S33), like the process at the step S10 in FIG. 6 or FIG. 8.

When the read reference value Tr is obtained, the distance L between the read head and the write head in the circumferential direction of the disk may be given by the equation L=Tw−Tr, and thereby the distance between the read head Hr and the write head Hw may be obtained for every magnetic disk drive. Based on the measured distance L, the write start position Tws of the predetermined data pattern for the write target position T may be decided according to the above equation, Tws=T+L.

As described above, in the magnetic disk drive system of this embodiment, since the distance or time difference between the read head and the write head in the circumferential direction of the disk can be measured by the magnetic disk drive itself, the timing of writing data may be set accurately, and thereby the efficiency of the disk format may be improved.

When the distance between the read head and the write head in the circumferential direction of the disk is measured, the data pattern for measurement is written in an appropriate position in advance, and then the write start position of the data for measurement is detected while shifting the read time of the data for measurement forward or backward sequentially, thus being detected over a wide range of read timing, and the measuring error may be minimized accordingly.

As the reference position for measuring the distance in the circumferential direction of the disk is the position of the servo mark in the servo information, the data pattern for measurement may be written in synchronization with the servo timing, thus being written accurately with reference to the servo mark.

As the data pattern for measurement is written in an area, at a sufficient distance from the rear end of the servo information where the time lag of the recovery clock is small, the data pattern for measurement is written without overwriting the servo information by mistake. Further, since the distance between the heads is measured before the data is written, the information written in the data is not erased.

If the writing frequency for the data pattern for measurement is the same as the writing frequency for the servo information, it is easy to read the data pattern in case that part of the servo function is used as the measuring function. In addition, if the writing frequency for the data pattern for measurement is the same as the writing frequency for user data, high resolution may be achieved.

Furthermore, when the arm moves in the radial direction of the disk and the heads are kept above a track, the distance between the heads in the circumferential direction of the track differs according to the position of the track in the radial direction of the disk and, hence, by measuring the distance between the heads for all of the tracks, the measurement error in the radial direction may be reduced, and thereby the accuracy of the distance measurement may be improved. On the other hand, by selecting a plurality of positions for measurement of the distance in the radial direction of the disk in advance, and determining the distances between the heads, which have not been measured, in relation to the other positions, by interpolation based on the measured distances between the heads, the number of the positions where the distance between the heads is measured may be decreased, and thereby the measuring time may be reduced.

By selecting the plurality of the positions in the radial direction on the disk at regular intervals, the computation of the interpolation process may be simplified.

On the other hand, in the area where the distance between the heads in the circumferential direction differs widely in the circumferential direction of the disk, the number of measurement positions may be further decreased by increasing the number of the measurement positions in the radial direction, and thereby the measurement accuracy may be improved.

When the number of the positions where the distance between the heads is the same as the number of the positions where the read/write demodulation parameter of data is modified, it is very convenient to use the heads for the data.

By also measuring the distance of the heads in terms of several cylinders which are in front and in rear of the position for measuring the distance between the heads, and obtaining the mean value of the measured distances based on the measuring results in terms of the several cylinders to take the mean value as the distance between the heads at the position, a mistake in the measurement may be prevented even if the sector for the measurement is abnormal.

In case that the data pattern for measurement is written, when the distance between the heads is measured, in all the sectors on a track at the same write time, and all of the data patterns are read to take the area end capable of being read in terms of all of the sectors on the track as the distance between the heads, if even a few of the data patterns could not be read, the counted number is not considered as the successful number, and thereby the measured distance of the heads is smaller than the actual distance of the heads, considering the fluctuation in the number of rotation of the disk.

Further, in case that the data pattern for measurement is written in all of the sectors on a track at the same write timing, and all of the data patterns are read to take the area end capable of being read in a certain ratio in terms of all of the sectors on the track as the distance between the heads, even if a few of the data patters could not be read, the counted number is considered as the successful number and, thereby, the measured distance of the heads is larger than the actual distance of the heads. In this case, variation of the fluctuation in the number of rotation of the disk is ignored.

Further, by writing the data pattern for measurement in part of the sectors of a round of the track at the same write timing, and taking the area end capable of being read for the sectors in which the data pattern has been written as the distance between the heads, it is possible to reduce the measurement time although the variation of the measurement between the sectors cannot be accommodated.

The timing of measuring the distance between the heads may also be set every time data is written in the data area of the disk, and may be set when the power is turned on. In these cases, as the measuring accuracy is improved but a long measuring time is required, it is also possible that the distance between the heads may be measured within the manufacturing process and not after the delivery of the magnetic disk drive.

Further, the distance between the heads measured by the magnetic disk drive system may be stored in the memory contained in the magnetic disk drive or may be written in the predetermined area on the disk. The measured distance may be read when data is written to determinate the position where the data is written. The measured distance may also be read when the power is turned on.

As described above, in the magnetic disk drive system according to the present invention, as the data pattern for measurement of the distance is written in advance before writing the predetermined data pattern, and the read timing about the start-up of the front end of the data pattern for measurement of the distance which has been written is detected, the distance, in the circumferential direction of the disk, between the read head and the write head incorporated in the magnetic disk drive, may be determined accurately.

Even if the distance between the write head and the read head is not checked when the heads are mounted, the relationship between the write timing of the write head and the read timing of the read head may be determined based on the computed distance. Consequently, the write timing with reference to the read head may be decided, and thereby a predetermined data pattern may be written in the area where a data pattern should be written, and hence the efficiency of the disk format may be improved.

What is claimed is:

1. A magnetic disk drive system which is able to write data on and read the data from a rotating magnetic disk by a write head and a read head respectively disposed at a distance from each other, comprising:
    a detecting unit which detects a position of the read head at the timing when the data is written with the write head and a position of the read head at the timing when the data is read with the read head; and
    a head-distance measuring unit which computes the distance based on the position detected by the detecting unit.

2. The magnetic disk drive system of claim 1, wherein the head-distance measuring unit computes said distance based on the position of the read head at the timing when said data is written with the write head and the position of the read head at the timing when said data is read with the read head.

3. The magnetic disk drive system of claim 1 or claim 2, wherein the write head writes the data for distance measurement in the position at a distance from the servo information in a sector, and the head-distance measuring unit computes said distance based on the position where the data for distance measurement has been written.

4. The magnetic disk drive system of claim 3, wherein the data for distance measurement is written in all of the sectors of said track at the same write timing and said distance is measured at said sectors.

5. The magnetic disk drive system of claim 3, wherein the data for distance measurement is written in a plurality of selected sectors on said track at the same write timing and said distance is measured at said sectors.

6. The magnetic disk drive system of claim 5, wherein the data for distance measurement is written in the sectors of all of the tracks of said disk at the same write timing and said distance is measured at said sectors.

7. The magnetic disk drive system of claim 5, wherein the data for distance measurement is written in the sectors of a plurality of the tracks selected of said disk at the same write timing, and said distance is measured at said sectors.

8. The magnetic disk drive system of claim 3, wherein said distance increases in the radial direction of said disk, the number of the sectors in which the data for distance measurement is written are increased per track.

9. The magnetic disk drive system of claim 3, wherein the data for distance measurement is written in a position predetermined with reference to said servo information.

10. The magnetic disk drive system claim 9, wherein the data for distance measurement is written at the write frequency of said servo information.

11. The magnetic disk drive system of claim 9, wherein the data for distance measurement is written at the write frequency of the data written in the data area of said disk.

12. The magnetic disk drive system of claim 3, wherein the head-distance measuring unit obtains the position of the read head at the time when reading the written data for distance measurement, and computes said distance.

13. The magnetic disk drive system of claim 12, wherein said position of the read head is detected with reference to said servo information.

14. The magnetic disk drive system of claim 13, wherein said position of the read head is detected by incrementing the read timing of the read head sequentially from the position predetermined with reference to said servo information.

15. The magnetic disk drive system of claim 13, wherein said position of the read head is detected by decrementing the read timing of the read head sequentially from the position predetermined with reference to said servo information.

16. The magnetic disk drive system of claim 13, wherein said position of the read head is detected by renewing the read timing of the read head while repeating an increment and a decrement of the read timing of the read head alternately centering the position predetermined with reference to said servo information.

17. The magnetic disk drive system of claim 13, wherein said position of the read head is detected by including an end position of the data for distance measurement in a search window opened at the read timing of the read head.

18. The magnetic disk drive system of claim 17, wherein said position of the read head is determined based on a largest one in a plurality of said read timings corresponding to a plurality of said search windows in which said end position is included.

19. The magnetic disk drive system of claim 13, wherein the read head performs a read operation at a same read timing for a plurality of sectors in which the data for distance measurement has been written.

20. The magnetic disk drive system of claim 1 or claim 2, wherein a plurality of positions are selected where said distance is measured in the radial direction of the disk, and distances that are not measured in relation to other positions are determined by interpolation based on said measurement of said plurality of positions.

21. The magnetic disk drive system of claim 20, wherein individual ones of said plurality of positions are selected at regular intervals.

22. The magnetic disk drive system of claim 1 or claim 2, wherein the distance measured by the head-distance measuring unit is stored.

23. The magnetic disk drive system of claim 22, wherein the distance measured by the head-distance measuring unit is stored in an internal memory of the system.

24. The magnetic disk drive system of claim 22, wherein the distance measured by the head-distance measuring unit is stored in said disk.

25. The magnetic disk drive system of claim 22, wherein said distance is measured and stored when the power of the system is turned on.

26. The magnetic disk drive system of claim 22, wherein said distance is read out when the power of the system is turned on.

27. The magnetic disk drive system of claim 22, wherein when data is written on said disk, the write timing of the write head is determined by adding said distance to a position where the data is written.

* * * * *